US009942457B2

(12) United States Patent
Yokomizo

(10) Patent No.: US 9,942,457 B2
(45) Date of Patent: Apr. 10, 2018

(54) IMAGING APPARATUS AND IMAGING SYSTEM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/120,489

(22) PCT Filed: Feb. 2, 2015

(86) PCT No.: PCT/JP2015/000443
§ 371 (c)(1),
(2) Date: Aug. 19, 2016

(87) PCT Pub. No.: WO2015/129162
PCT Pub. Date: Sep. 3, 2015

(65) Prior Publication Data
US 2017/0070657 A1   Mar. 9, 2017

(30) Foreign Application Priority Data
Feb. 28, 2014   (JP) .................................. 2014-039030

(51) Int. Cl.
*H04N 5/232* (2006.01)
*G06F 11/00* (2006.01)
(Continued)

(52) U.S. Cl.
CPC ......... *H04N 5/23206* (2013.01); *G06F 11/00* (2013.01); *H04L 67/1097* (2013.01); *H04N 5/23293* (2013.01); *H04N 7/183* (2013.01)

(58) Field of Classification Search
CPC ........... H04N 5/23206; H04N 5/23293; H04N 7/183; H04N 1/00204; H04N 1/00944;
(Continued)

(56) References Cited

U.S. PATENT DOCUMENTS 7,281,048 B2 * 10/2007 Watanabe .......... H04N 1/00148
382/305
8,051,113 B1 * 11/2011 Shekar .............. G06F 17/30067
707/821

(Continued)

FOREIGN PATENT DOCUMENTS

CN   103297532 A   9/2013
EP   2538672 A1   12/2012
(Continued)

*Primary Examiner* — Pritham Prabhakher
(74) *Attorney, Agent, or Firm* — Canon U.S.A., Inc. IP Division

(57) ABSTRACT

An imaging apparatus to communicate with an external apparatus over a network and mount a first storage and/or a second storage includes a receiving unit, a mounting unit, and a control unit. The receiving unit can receive a first mount command to mount the first storage and a second mount command to mount the second storage. The control unit instructs the mounting unit to mount the first storage and/or the second storage. If a mount command received is a first mount command, the control unit instructs the mounting unit to mount the first storage by a first access protocol for accessing the first storage. If the mount command received is a second mount command, the control unit instructs the mounting unit to mount the second storage by a second access protocol which is an access protocol for accessing the second storage and is different from the first access protocol.

7 Claims, 14 Drawing Sheets

(51) Int. Cl.
*H04L 29/08* (2006.01)
*H04N 7/18* (2006.01)

(58) Field of Classification Search
CPC ........... H04N 1/00946; H04N 1/00095; H04N 1/00973; H04N 1/2166; H04N 1/32358; H04N 1/32101; H04N 1/00209; H04N 1/00244; H04N 2201/0039; H04N 2201/0043; H04N 2201/0046; H04N 2201/0094; H04L 67/1097; G06F 11/00; G06F 13/10; G06F 3/1293; G06F 3/1296; G06F 3/0605; G06F 3/0635; G06F 3/0683; G11B 27/002; G11B 2220/41
USPC ........................................................ 348/211.3
See application file for complete search history.

(56) References Cited

U.S. PATENT DOCUMENTS

| | | | | |
|---|---|---|---|---|
| 8,941,783 | B2* | 1/2015 | Hagiwara | H04N 5/44591 348/588 |
| 8,990,408 | B1* | 3/2015 | Owen | H04L 67/303 709/227 |
| 9,203,809 | B2* | 12/2015 | Kim | H04L 61/2514 |
| 9,244,969 | B1* | 1/2016 | Love | G06F 17/30386 |
| 9,336,233 | B2* | 5/2016 | Chatley | G06F 3/0613 |
| 9,497,257 | B1* | 11/2016 | Love | H04L 67/06 |
| 9,571,433 | B2* | 2/2017 | Osuka | H04L 67/2823 |
| 2005/0007459 | A1* | 1/2005 | Kawai | H04N 5/232 348/211.99 |
| 2006/0095422 | A1* | 5/2006 | Kikuchi | G06F 17/30899 |
| 2006/0136707 | A1* | 6/2006 | Fukasawa | H04N 1/00204 713/2 |
| 2007/0088702 | A1 | 4/2007 | Fridella | |
| 2008/0222158 | A1* | 9/2008 | Saika | G06F 17/30197 |
| 2009/0089522 | A1* | 4/2009 | Kulkarni | G06F 11/1464 711/162 |
| 2009/0251566 | A1* | 10/2009 | Uemura | G11B 27/034 348/231.99 |
| 2011/0019216 | A1* | 1/2011 | Kataoka | H04N 1/00222 358/1.13 |
| 2011/0029745 | A1* | 2/2011 | Nakahama | G06F 13/385 711/154 |
| 2011/0102546 | A1 | 5/2011 | Dhuse | |
| 2011/0118619 | A1* | 5/2011 | Burton | A61B 5/0476 600/544 |
| 2012/0158806 | A1* | 6/2012 | Snyder | H04L 67/1097 707/827 |
| 2012/0169874 | A1* | 7/2012 | Thomas | H04N 5/23206 348/143 |
| 2012/0239655 | A1* | 9/2012 | Cok | G06F 17/30265 707/739 |
| 2012/0242845 | A1* | 9/2012 | Tan | H04N 1/00413 348/207.1 |
| 2013/0067029 | A1* | 3/2013 | Osuka | H04L 67/2823 709/217 |
| 2014/0136485 | A1* | 5/2014 | Miyoshi | G06F 3/0617 707/654 |
| 2014/0211018 | A1* | 7/2014 | de Lima | H04N 7/181 348/159 |
| 2015/0146019 | A1* | 5/2015 | Aoyama | H04N 1/00129 348/207.1 |
| 2015/0234719 | A1* | 8/2015 | Coronado | G06F 11/203 714/6.3 |
| 2015/0264202 | A1* | 9/2015 | Pawlowski | H04N 1/00106 348/207.11 |
| 2015/0281354 | A1* | 10/2015 | Jin | H04L 67/1097 709/213 |

FOREIGN PATENT DOCUMENTS

| | | |
|---|---|---|
| JP | H04-297945 A | 10/1992 |
| JP | 2000165794 | 6/2000 |
| JP | 2003-241903 A | 8/2003 |
| JP | 2005-165507 A | 6/2005 |
| JP | 2013005453 A | 1/2013 |
| WO | 2015141141 A1 | 9/2015 |

* cited by examiner

FIG. 4A

```
<xs:complexType name="StorageConfiguration">
  <xs:complexContent>
    <xs:extension base="tt:DeviceEntity">
      <xs:sequence>
        <xs:element name="Data" type="tt:StorageConfigurationData"/>
      </xs:sequence>
      <xs:anyAttribute processContents="lax"/>
    </xs:extension>
  </xs:complexContent>
</xs:complexType>
```

FIG. 4B

```
<xs:complexType name="StorageConfigurationData">
  <xs:sequence>
    <xs:element name="LocalPath" type="tt:anyURI" minOccurs="0"/>
    <xs:element name="StorageUri" type="xs:anyURI" minOccurs="0"/>
    <xs:element name="User" type="tt:UserCredentials" minOccurs="0"/>
    <xs:element name="Extension" type="StorageConfigurationExtension" minOccurs="0"/>
  </xs:sequence>
  <xs:attribute name="type" type="xs:string" use="required"/>
  <xs:anyAttribute processContents="lax"/>
</xs:complexType>
```

FIG. 4C

```
<xs:complexType name="UserCredentials">
  <xs:sequence>
    <xs:element name="Username" type="xs:string"/>
    <xs:element name="Password" type="xs:string" minOccurs="0"/>
    <xs:element name="Extension" type="tt:UserCredentialsExtension" minOccurs="0"/>
  </xs:sequence>
  <xs:anyAttribute processContents="lax"/>
</xs:complexType>
```

FIG. 4D

```
<xs:simpleType name="StorageType">
  <xs:restriction base="xs:string">
    <xs:enumeration value="NFS"/>
    <xs:enumeration value="SMB"/>
    <xs:enumeration value="CIFS"/>
    <xs:enumeration value="CDMI"/>
    <xs:enumeration value="SDCARD"/>
    <xs:enumeration value="AUTO"/>
    <xs:enumeration value="Extended"/>
  </xs:restriction>
</xs:simpleType>
```

FIG. 4E

```
<xs:complexType name="StorageConfigurationOption">
  <xs:sequence>
    <xs:element name="type" type="tt: StorageType " minOccurs="0"/>
  </xs:sequence>
  <xs:anyAttribute processContents="lax"/>
</xs:complexType>
```

FIG. 6

```
(1) GetStorageConfigurationOptions command
<s:Envelope xmlns:s="http://www.w3.org/2003/05/soap-envelope"
xmlns:a="http://www.w3.org/2005/08/addressing">
  <s:Body xmlns:xsi="http://www.w3.org/2001/XMLSchema-instance"
xmlns:xsd="http://www.w3.org/2001/XMLSchema">
    <GetStorageConfigurationOptions xmlns="http://www.onvif.org/ver10/device/wsdl"/>
  </s:Body>
</s:Envelope>

(2) GetStorageConfigurationOptions response
<s:Envelope xmlns:s="http://www.w3.org/2003/05/soap-envelope"
xmlns:tt="http://www.onvif.org/ver10/schema" xmlns:dm="http://www.onvif.org/ver10/device/wsdl">
  <s:Body>
    <dm:GetStorageConfigurationOptionsResponse>
      <tt:StorageConfigurationOptions>
        <tt:type>CIFS</tt:type>
        <tt:type>CDMI</tt:type>
        <tt:type>SDCARD</tt:type>
        <tt:type>AUTO</tt:type>
      </tt:StorageConfigurationOptions>
    </dm:GetStorageConfigurationOptionsResponse>
  </s:Body>
</s:Envelope>
```

FIG. 7

```
(1) SetStorageConfiguration command
<s:Envelope xmlns:s="http://www.w3.org/2003/05/soap-envelope"
xmlns:a="http://www.w3.org/2005/08/addressing">
 <s:Body xmlns:xsi="http://www.w3.org/2001/XMLSchema-instance"
xmlns:xsd="http://www.w3.org/2001/XMLSchema">
   <SetStorageConfiguration xmlns="http://www.onvif.org/ver10/device/wsdl">
     <tt:StorageConfiguration token="storage1" type="AUTO">
       <tt:Data/>
     </tt:StorageConfiguration>
   </SetStorageConfiguration>
 </s:Body>
</s:Envelope>

(2) SetStorageConfiguration response
<s:Envelope xmlns:s="http://www.w3.org/2003/05/soap-envelope"
xmlns:tt="http://www.onvif.org/ver10/schema" xmlns:dm="http://www.onvif.org/ver10/device/wsdl">
 <s:Body>
   <dm:SetStorageConfigurationResponse/>
 </s:Body>
</s:Envelope>
```

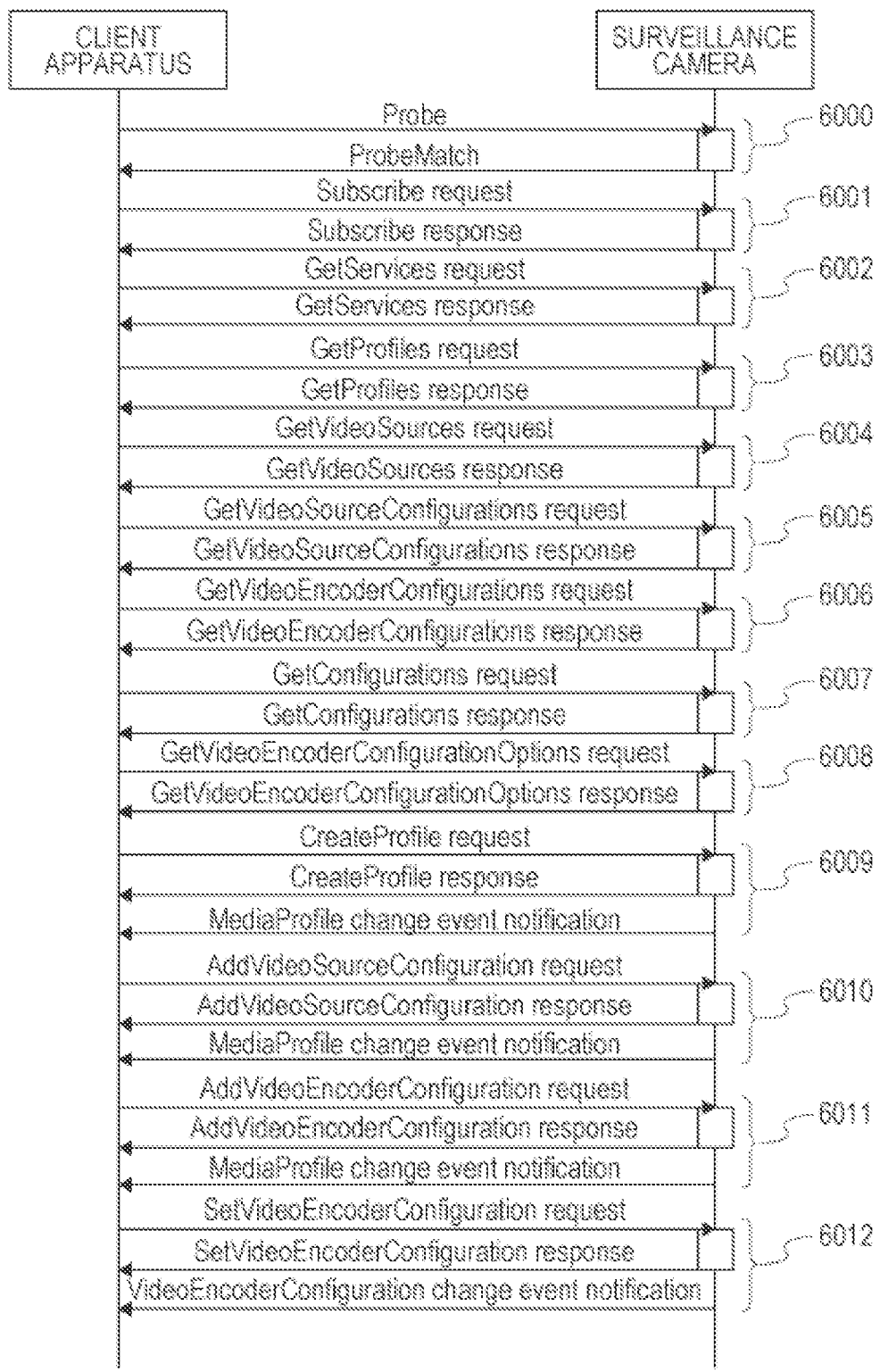

FIG. 11

| TOKEN TYPE | ACCESSING PROTOCOL TYPE |
|---|---|
| StoreToken1 | Local storage |
| StoreToken2 | NFS |
| StoreToken3 | CDMI |

IMAGING APPARATUS AND IMAGING SYSTEM

TECHNICAL FIELD

The present invention relates to an imaging us and an imaging system. In particular, the present invention relates to an imaging apparatus and imaging system which record data in a storage.

BACKGROUND ART

In recent years, some large capacity storages having high functionality may be constructed on an IP network. As such a storage, a network storage system may be mounted by a host apparatus to make it available. Here, the term "mount" refers to allowing a storage to be written or read to or from it, for example.

With spread of network storages, various protocols exist for accesses to network storages. Such protocols may be NFS (Network File System), SMB, CIFS (Common Internet File System), or CDMI (Cloud Data Management Interface), for example.

PTL 1 discloses a storage system which accepts different accesses from a plurality of external apparatuses.

In the past, an imaging apparatus which transmits a captured image to a client apparatus may have a group of commands (command group) to instruct to change a setting for the imaging apparatus from a client apparatus and to start a distribution of an image. Recently, some of such command groups have been known which are defined by a standard settled by ONVIF (Open Network Video Interface Forum).

However, technologies in the past do not assume that an imaging apparatus, for example, is allowed to mount a network storage. In addition, because many kinds of network storages are available, a user may be required to perform a significantly complicated setting jobs for mounting them.

As commands for mounting a network storage in an imaging apparatus, common commands (standardized commands) such as a command group settled by ONVIF may be assumed to be used among imaging apparatuses from various manufactures.

However, even under such an assumption, compatibility of such command may be difficult to obtain from a viewpoint that a plurality of network storages for different file systems from each other must be designated by using the commands.

The present invention was made in view of such a viewpoint, and an imaging apparatus may allow easy mount of first and second storages which are accessed in different manners from each other.

CITATION LIST

Patent Literature

PTL 1: Japanese Patent Laid-Open No. 2003-241903

SUMMARY OF INVENTION

According to an aspect of the present invention, an imaging apparatus to communicate with an external apparatus over a network and mount a first storage and/or a second storage includes a receiving unit capable of receiving, from the external apparatus over the network, a first mount command allow the imaging apparatus to mount the first storage and a second mount command to allow the imaging apparatus to mount the second storage, a mounting unit configured to mount the first storage and/or the second storage; and a control unit configured to instruct the mounting unit, wherein, if a mount command received by the receiving unit is a first mount command, the control unit instructs the mounting unit to mount the first storage by a first access protocol for accessing the first storage and, wherein, if the mount command received by the receiving unit is a second mount command, the control unit instructs the mounting unit to mount the second storage by a second access protocol which is an access protocol for accessing the second storage and is different from the first access protocol.

Further features of the present invention will become apparent from the following description of exemplary embodiments with reference to the attached drawings.

BRIEF DESCRIPTION OF DRAWINGS

FIG. 4A illustrates an example of a definition of a StorageConfiguration according to the first exemplary embodiment of the present invention.

FIG. 4B illustrates an example of a definition of a StorageConfiguration according to the first exemplary embodiment of the present invention.

FIG. 4C illustrates an example of a definition of a StorageConfiguration according to the first exemplary embodiment of the present invention.

FIG. 4D illustrates an example of a definition of a StorageConfiguration according to the first exemplary embodiment of the present invention.

FIG. 4E illustrates an example of a definition of a StorageConfiguration according to the first exemplary embodiment of the present invention.

FIG. 6 illustrates an example of a configuration of commands and responses in GetStorageConfigurationOptions according to the first exemplary embodiment of the present invention.

FIG. 7 illustrates an example of a configuration of commands and responses in SetStorageConfigurationOptions according to the first exemplary embodiment of the present invention.

FIG. 8 is a command sequence diagram between the surveillance camera and the client apparatus according to the first exemplary embodiment of the present invention.

FIG. 11 is a diagram for explaining a table illustrating correspondence between Token types of a StorageConfiguration and accessing protocol types according to the first exemplary embodiment of the present invention.

DESCRIPTION OF EMBODIMENTS

The present invention will be described below in detail by describing exemplary embodiments thereof. Configurations according to exemplary embodiments will be given for illustration purpose only, and the present invention is not limited to the illustrated configurations. It is assumed that command according to the following exemplary embodiments are defined based on Open Network VideoInterface Forum (hereinafter, sometimes be called ONVIF), for example.

In order to define data or a command such as a StorageConfiguration, XML Schema Definition language (hereinafter, called an XSD) used in ONVIF standard is used.

First Exemplary Embodiment

Figure 1:
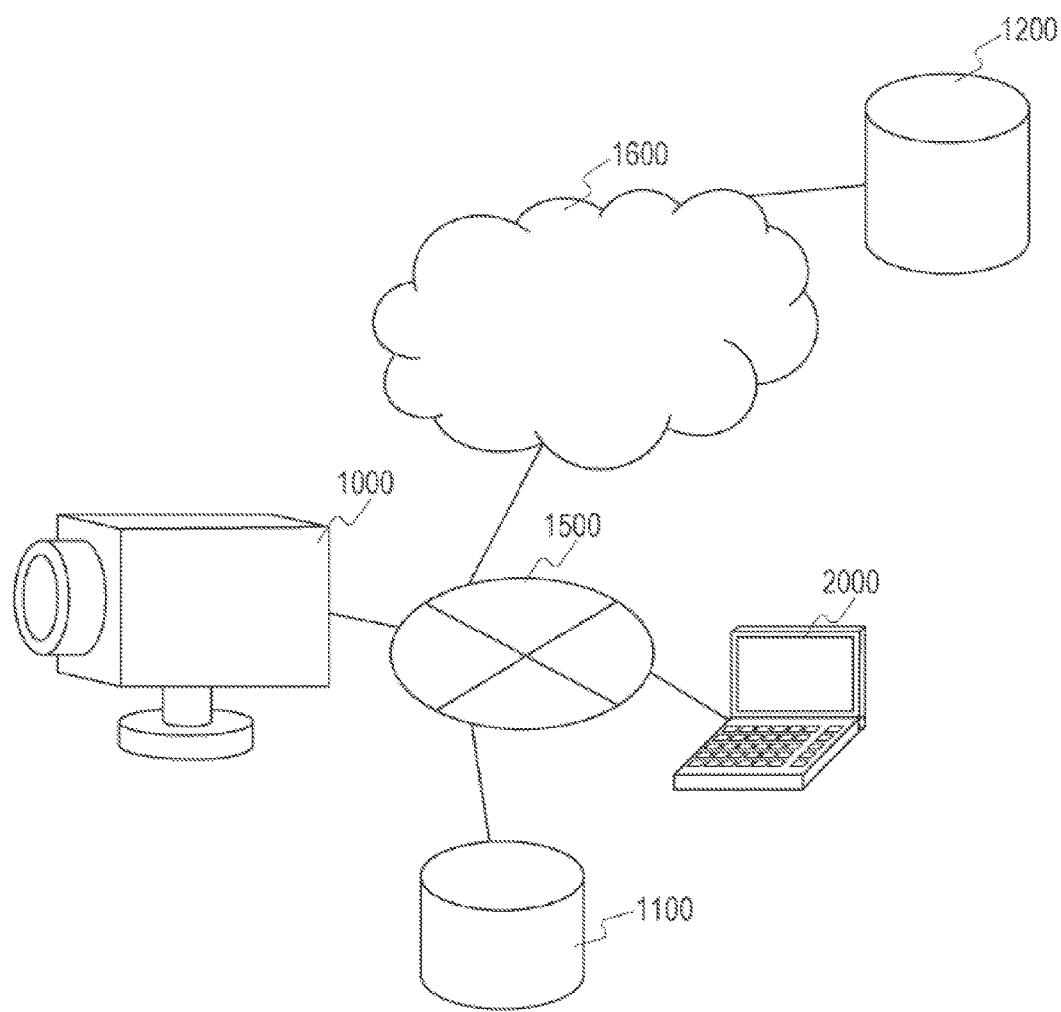
FIG. 1 is a system configuration diagram for explaining a configuration of an imaging system according to a first exemplary embodiment of the present invention.

FIG. 1 illustrates a system configuration for illustrating an imaging system including a surveillance camera 1000 which is an imaging apparatus and a client apparatus 2000 according to an exemplary embodiment. The client apparatus 2000 is an external apparatus according to this exemplary embodiment. The surveillance camera 1000 and the client apparatus 2000 are connected mutually communicably through an IP network 1500 (over a network).

A network attached storage 1100 is connected to the IP network 1500. Hereinafter, a network attached storage will be called a NAS. The NAS 1100 may include interfaces such as a CIFS (Common Internet File System), an NFS (Network File System), and an SMB, for example.

The NAS 1100 may be mounted by the surveillance camera 1000 to be connected to the IP network 1500 so as to allow access from the surveillance camera 1000.

A cloud storage 1200 is usable through the Internet 1600 (what-is-called a cloud). The cloud storage 1200 may include a CDMI (Cloud Data Management Interface), for example. The cloud storage 1200 is mounted by the surveillance camera 1000 to be connected to the IP network 1500 so as to allow access from the surveillance camera 1000.

The client apparatus 2000 transmits commands to change an imaging parameter and start video streaming, which will be described below, to the surveillance camera 1000, for example. The surveillance camera 1000 transmits to the client apparatus 2000 responses to those commands and a video stream.

The imaging system according to this exemplary embodiment is an example of a transmitting/receiving system. The surveillance camera 1000 according to this exemplary embodiment is an imaging apparatus which captures a moving image and particularly is a network camera usable for surveillance.

The IP network 1500 may include a plurality of routers, a switch, and a cable which satisfy a communication standard for Ethernet (registered trademark), for example. However, according to this exemplary embodiment, any communication standards, sizes and configurations may be used as far as they allow communication between the surveillance camera 1000 and the client apparatus 2000.

For example, the IP network 1500 may include the Internet, a wired LAN (Local Area Network), a wireless LAN, and a WAN (Wide Area Network). The surveillance camera 1000 according to this exemplary embodiment may support PoE (Power Over Ethernet (registered trademark)), for example, and may receive power supply through a LAN cable.

Figure 2A:
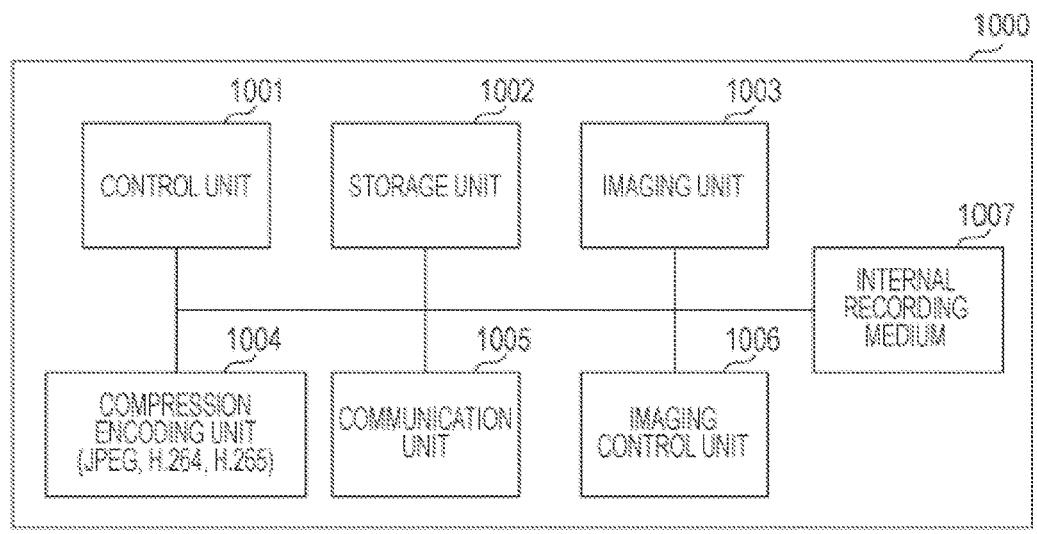
FIG. 2A is a block diagram illustrating an internal configuration of a surveillance camera included in an imaging system according to the first exemplary embodiment of the present invention.
Figure 2B:
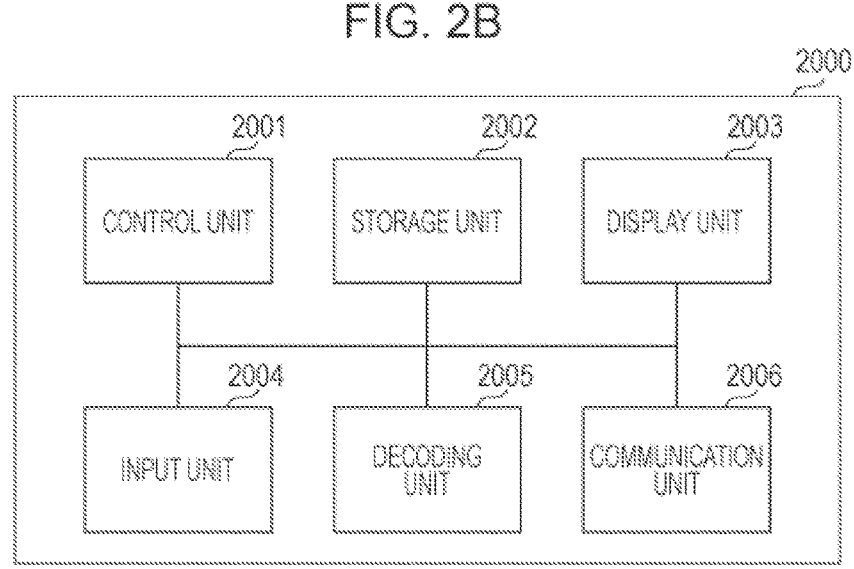
FIG. 2B is a block diagram illustrating an internal configuration of a client apparatus included in an imaging system according to the first exemplary embodiment of the present invention.

FIGS. 2A and 2B are block diagrams illustrating internal configurations of the surveillance camera 1000 and client apparatus 2000 according to this exemplary embodiment. FIG. 2A is a block diagram illustrating an internal configuration of the surveillance camera 1000. On the other hand, FIG. 2B is a block diagram illustrating an internal configuration of the client apparatus 2000.

Referring to FIG. 2A, a control unit 1001 generally controls the surveillance camera 1000. The control unit 1001 may include a CPU (Central Processing Unit), for example. A storage unit 1002 may be used mainly as storage areas for various data, such as a storage area for a program to be executed by the control unit 1001, a work area usable during execution of a program, and a storage area for an image captured by the image capturing unit 1003.

An image capturing unit 1003 converts an analog signal acquired by capturing an image of a subject formed by an imaging optical system of the surveillance camera 1000 to digital data and outputs them as a captured image to the storage unit 1002. The control unit 1001, which will be described below, receives an image acquisition event from the image capturing unit 1003 if a captured image is output from the image capturing unit 1003 to the storage unit 1002.

A compression encoding unit 1004 performs a compression encoding process based on PEG or H.264 on the captured image output by the image capturing unit 1003 to create image data and outputs the created image data to the storage unit 1002. In this case, the compression encoding unit 1004 causes the control unit 1001 to issue a VIDEO transmission trigger and notifies that image data that may be distributed-d has been output to the storage unit 1002.

A communication unit 1005 is used in a case where a control command is received from an external apparatus, where a response to a control command and a stream including image data are to be transmitted to an external apparatus or the like. The communication unit 1005 according to this exemplary embodiment corresponds to a distribution unit which distributes image data output from the compression encoding unit 1004. In a case where the communication unit 1005 receives a command from an external apparatus, the control unit 1001 receives a command reception event from the communication unit 1005.

An imaging control unit 1006 is usable for controlling a tilt mechanism, a pan mechanism, or a zoom mechanism in accordance with a value of a pan angle, a tilt angle or a zoom scaling factor input by the control unit 1001. Thus, the imaging range of the image capturing unit 1003 is driven in a tilt direction and a pan direction. This drives the zoom scaling factor so as to correspond to the imaging range.

The imaging control unit 1006 provides current operation states of a pan, tilt, and zooming mechanisms (not illustrated) as PTZ Status information to the control unit 1001 by setting a PTZStatus transmission flag.

According to this exemplary embodiment, each of the compression encoding unit 1004 and the imaging control unit 1006 may be a sub-CPU, for example. According to this exemplary embodiment, each of the pan mechanism, tilt mechanism, and zooming mechanism may include a stepping motor and a gear, for example. Each of the pan mechanism, tilt mechanism, and zooming mechanism may be an example of a changing unit configured to change the position of the image capturing unit 1003.

An internal recording medium 1007 is internally provided in the surveillance camera 1000. The internal recording medium 1007 is a storage usable by the control unit 1001 to save data, for example.

Here, the internal recording medium 1007 may include an SD memory card and a USB drive insertable and removable to and from the surveillance camera 1000 or a hard disk drive removably attached to the surveillance camera 1000, and a file system supporting them, for example.

Next, referring to FIG. 2B, a control unit 2001 may be a CPU and generally control the client apparatus 2000, for example. A storage unit 2002 may be used mainly as storage areas for various data, such as a storage area for a program to be executed by the control unit 2001, and a work area usable during execution of a program.

A display unit 2003 may be an LCD, or an organic electroluminescence display, for example, and may display various setting screens, a viewer for video images received from the surveillance camera 1000, and a message to a user of the video client apparatus 2000. The various setting screens may include a StorageConfiguration screen, which will be described below.

An input unit 2004 may include a button, a cross key, a touch panel, and a mouse, for example, and notifies details of a screen operation performed by a user to the control unit 2001. A decoding unit 2005 decodes compression encoded image data received through a communication unit 2006 based on a format such as PEG or H.264 and decompresses them into the storage unit 2002.

The communication unit 2006 is usable for transmitting a control command to the surveillance camera 1000 and receiving a response to a control command and a stream including image data to the surveillance camera 1000. According to this exemplary embodiment, the decoding unit 2005 may be a sub-CPU, for example.

Having described the internal configurations of the surveillance camera 1000 and the client apparatus 2000 with reference to FIGS. 2A and 2B, the processing blocks illustrated in FIGS. 2A and 2B are given for illustrating an exemplary embodiment of the surveillance camera and client apparatus according to the present invention. The present invention is not limited thereto. Various modifications and changes may be made thereto without departing from the spirit and scope of the present invention, such as inclusion of an audio input unit, an audio output unit, and an image analysis processing unit.

Figure 3:
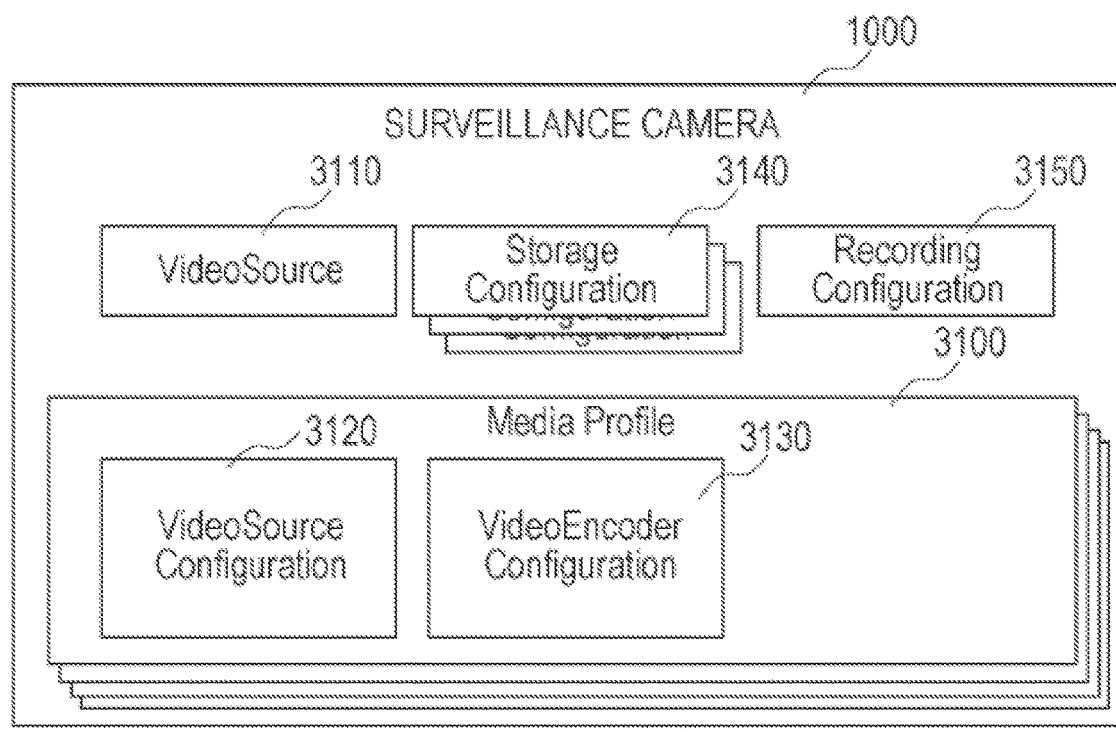
FIG. 3 is a configuration diagram of parameters held by the surveillance camera according to the first exemplary embodiment of the present invention.

Next, with reference to FIGS. 3 to 7, names and details of commands and parameters used in this exemplary embodiment will be described below. FIG. 3 illustrates a structure of parameters held in (the storage unit 1002 of) the surveillance camera 1000 according to this exemplary embodiment.

Hereinafter, a VideoSourceConfiguration, which will be described below, will sometimes be called a VSC. Also, a VideoEncoderConfiguration will sometimes be called a VEC.

A MediaProfile 3100 illustrated in FIG. 3 is held by the surveillance camera 1000. The term "MediaProfile" refers to a parameter set for storing setting items of the surveillance camera 1000 in association with each other. Such setting items may include a setting item for distributing a stream including image data by the surveillance camera 1000. The MediaProfile is stored in the storage unit 1002.

Hereinafter, the MediaProfile will sometimes be called an MP.

An MP 3100 holds a ProfileToken which is an ID of the MP 3100. The MP 3100 further holds links to setting items including a VSC 3120 and a VEC 3130. The surveillance camera 1000 may hold a plurality of MediaProfiles. A VideoSource 3110 is a set of parameters describing performances of one image capturing unit 1003 included in the surveillance camera 1000.

Hereinafter, the VideoSource will sometimes be called a VS. The VS according to this exemplary embodiment corresponds to image pickup device setting information regarding setting of an image pickup device.

The VS 3110 may include a VideoSourceToken which is an ID of the VS 3110 and a parameter such as a Resolution describing a resolution of image data which may be output by the image capturing unit 1003.

The VSC 3120 is a set of parameters for associating a VS 3110 included in the surveillance camera 1000 with the MP 3100. The VSC 3120 holds a VideoSourceToken describing an ID of the VS 3110. The VSC 3120 holds Bounds designating a cutout size and a cutout position of an image output by the image capturing unit 1003. In the following description of this exemplary embodiment, further details of the VSC 3120 will not be described.

The VEC 3130 is a set of parameters for associating an encoder setting regarding compression encoding on image data with the MP 3100. The encoder setting may be a setting for the compression encoding unit 1004, for example. The VEC 3130 includes a ConfigurationToken which is an ID of the VEC 3130.

The VEC 3130 includes an Encoding designating a compression encoding method and a Resolution designating a resolution of an output image. The VEC 3130 further includes a Quality designating a quality of compression encoding, a FramerateLimit designating a maximum frame rate of an output image, and a BitrateLimit designating a maximum bit rate. In the following description of this exemplary embodiment, further details of the VEC will not be described.

The surveillance camera 1000 performs a compression encoding based on the VEC 3130 on a captured image output from the image capturing unit 1003 based on details of the VS 3110 and VSC 3120 and distributes the resulting image data to an external apparatus including the client apparatus 2000 through the communication unit 1005.

More specifically, the compression encoding unit 1004 encodes the captured image in accordance with a parameter such as an encoding method, a frame rate or a resolution set by the VEC 3130 to create image data.

A StorageConfiguration (hereinafter, sometimes called an SC) 3140 is a set of parameters for holding information for accessing a storage usable by the surveillance camera 1000. Details of the SC 3140 will be described below.

A RecordingConfiguration (hereinafter, sometimes called an RC) 3150 is a structure holding information regarding a Recording abstracting a file for recording. The Recording is held (stored) in the storage unit 1002 in the surveillance camera 1000.

The RC 3150 holds a RecordingToken for identifying a Recording. In other words, a RecordingToken is an ID of a Recording. Such a RecordingToken corresponds to a recording file.

Next, FIGS. 4A to 4E illustrate examples of a definition of a StorageConfiguration according to this exemplary embodiment. As illustrated in FIG. 4A, a DeviceEntity is included. The DeviceEntity includes a StorageToken which is an ID of an SC. Here, the StorageToken is information by which an SC held in the surveillance camera 1000 is uniquely identifiable (that is, an ID of the SC).

The DeviceEntity holds a StorageConfigurationData structure holding detail information for accessing a Storage. Details of the StorageConfigurationData (structure) will be described below. In the SC, the DeviceEntity may not be omitted.

FIG. 4B illustrates details of the StorageConfigurationData structure. As illustrated in FIG. 4B, the StorageConfigurationData structure may include a LocalPath, a StorageUri, a User, and a type. The LocalPath is for holding a mount destination information.

The mount destination information is information used for mounting an external storage designated in the SC 3140 into the surveillance camera 1000, for example.

An example of the mount destination information may be a path of a mount destination directory such as "/mnt/cifs 1" in a case where the surveillance camera 1000 holds a file system. Alternatively, an example of the mount destination information may be a drive name or a drive symbol such as "E" by which a mounted storage is uniquely identifiable.

In a case where the LocalPath is identifiable in the surveillance camera 1000, the LocalPath (or mount destination information held by the LocalPath) may be omitted.

The StorageUri holds an address of an external storage mounted by the SC. The StorageUri may be a URI (Uniform Resource Identifier) "//cifs_server/disk 1/share/" designated with an IP address or a host name, for example.

The StorageUri may be a path such as "/dev/SD card/1" of a device file describing an SD card drive in a case where an SD card included in the surveillance camera 1000 is to be mounted.

Alternatively, various URIs may be designated as the StorageUri in accordance with an accessing protocol type (type). In a case where an address of an external storage to be mounted is identifiable in the surveillance camera 1000, the information may be omitted.

The User holds authentication information including a user name and a password for accessing an external storage designated by the StorageUri. Details of the User will be described below. The User may sometimes be omitted in a case where an external storage which does not require authentication information is mounted in the surveillance camera 1000.

The type is information for selecting a type of accessing protocol for an external storage. The type holds information describing a type of an external storage mounted by an SC from a list of accessing protocol types described in "StorageType", which will be described below. For example, the type may be a required item in an SC and is not allowed to be omitted.

FIG. 4C illustrates details of a UserCredentials structure. The UserCredentials structure is referred as the User in FIG. 4B. As illustrated in FIG. 4C, the UserCredentials structure may include a Username and a Password, for example. The Username holds a user name usable for accessing an external storage designated by a StorageUri.

The Password holds a password usable for accessing an external storage designated by a StorageUri. The Password may be omitted in a case where the surveillance camera 1000 accesses an external storage which does not require a password.

FIG. 4D illustrates a list of storage accessing protocol types used by the types above. The types may include an NFS, an SMB, a CIFS, a CDMI, an SD CARD, and an AUTO. The NFS stands for Network File System. The NFS is defined in an RFC 1094, an RFC 1813, an RFC 3530 and so on and includes a distributed file system and its protocol normally utilized by a UNIX (registered trademark).

The SMB is a widely used file sharing service protocol. The CIFS stands for Common Internet File System. The CIFS is an extension of SMB and is a standard protocol usable for providing access to a file system over a standard network.

The CDMI stands for Cloud Data Management Interface. The CDMI is a standard protocol usable for providing a cloud service for a storage. The SD CARD refers to an SD memory card. The SD memory card is a type of the internal recording medium 1007 included in the surveillance camera 1000. The SD CARD is designated when the internal recording medium 1007 is mounted.

The AUTO is an option to be designated in a case where a storage mounted by the surveillance camera 1000 is not identifiable by the client apparatus 2000. If the client apparatus 2000 designates SC of AUTO, the surveillance camera 1000 selects an appropriate storage in accordance with independently determined priority levels and an algorithm.

Next, FIG. 4E illustrates details of an SCOption structure. The SCOption structure holds a type. The type holds one accessing protocol type as described with reference to FIG. 4D. The type is a list of accessing protocol types of a storage which may be mounted by the surveillance camera 1000.

Figure 5:
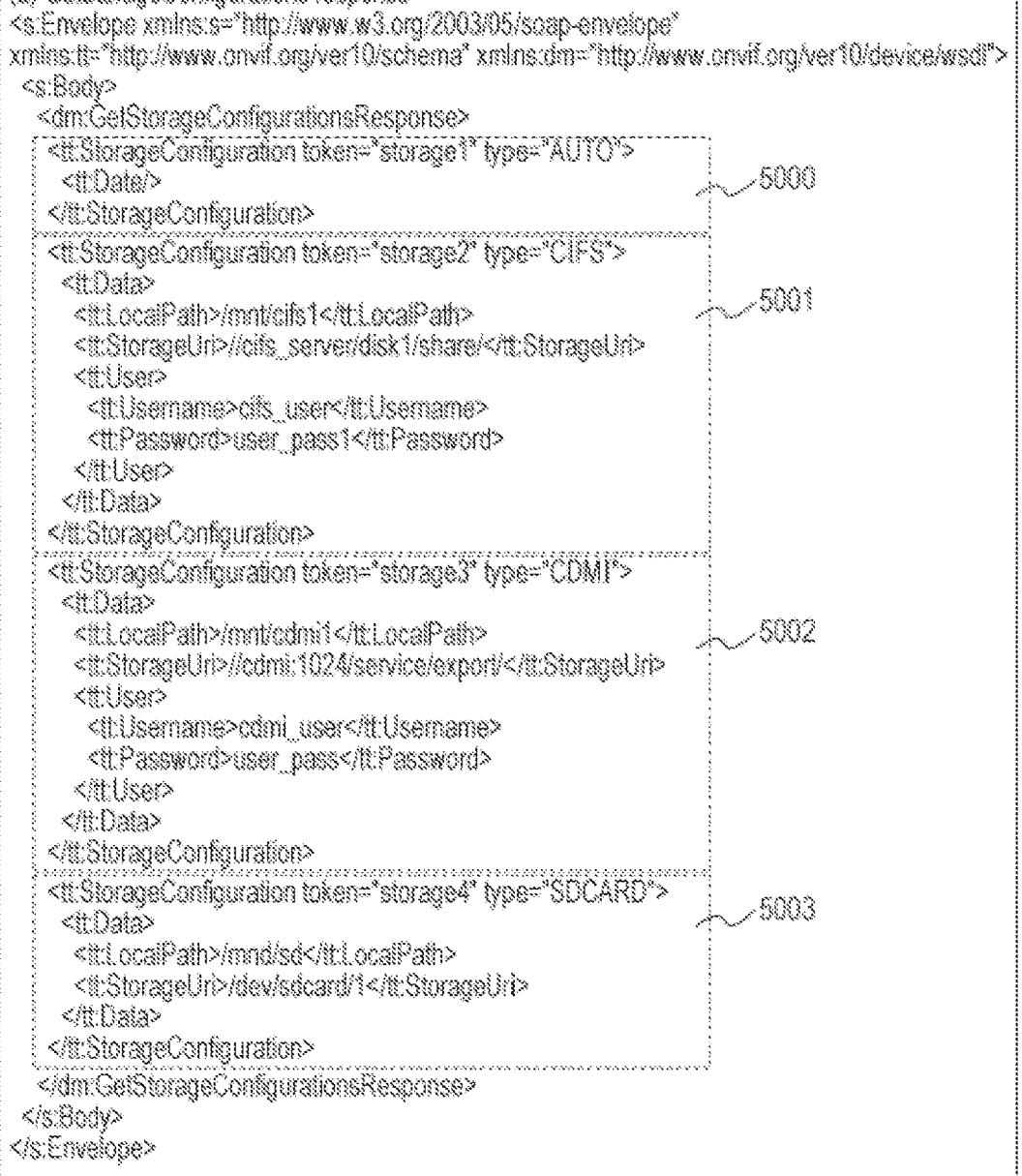
FIG. 5 illustrates an example of a configuration of commands and responses in GetStorageConfigurations according to the first exemplary embodiment of the present invention.

FIG. 5 illustrates an example of a configuration of commands and responses of GetStorageConfigurations according to this exemplary embodiment. (1) in FIG. 5 illustrates details of a GetSCs command to be transmitted from the client apparatus 2000 to the surveillance camera 1000. (2) in FIG. 5 illustrates details of a GetSCs response to be transmitted from the surveillance camera 1000 to the client apparatus 2000.

The GetSCs command as illustrated in (1) in FIG. 5 allows the client apparatus 2000 to acquire a list of SCs held by the surveillance camera 1000. In the example in (2) in FIG. 5, the surveillance camera 1000 returns four SCs 5000 to 5003.

The SC 5000 in (2) in FIG. 5 has storage1 as a value of its StorageConfigurationToken and AUTO as a value of its type. When the SC 5000 is used by the client apparatus 2000, the surveillance camera 1000 automatically select a storage to/from data are input/output.

The SC 5001 has storage2 as a value of its StorageToken and CIFS as a value of its type. When the SC 5001 is used by the client apparatus 2000, the surveillance camera 1000 exchanges data with an external storage using a CIFS protocol identified by "//cifs_server/disk 1/share/".

The SC 5002 has storage3 as a value of its StorageToken and CDMI as a value of its type. When the SC 5002 is used by the client apparatus 2000, the surveillance camera 1000 exchanges data with a cloud service storage using a CDMI protocol identified by "//cdmi:1024/service/export/".

The SC 5003 has storage4 as a value of its StorageToken and has SD CARD as a value of its type. When the SC 5003 is used by the client apparatus 2000, the surveillance camera 1000 exchanges data with the internal recording medium 1007 which is an SD card identified by "/dev/SD card/1".

FIG. 6 illustrates an example of a configuration of commands and responses in GetStorageConfigurationOptions according to this exemplary embodiment. (1) in FIG. 6 illustrates details of a command of GetSCOptions to be transmitted from the client apparatus 2000 to the surveillance camera 1000. (2) in FIG. 6, on the other hand, illustrates details of a response to GetSCOptions to be returned from the surveillance camera 1000 to the client apparatus 2000.

As illustrated, in (1) in FIG. 6, the GetSCOptions command allows the client apparatus 2000 to acquire a list of accessing protocol types supported by the surveillance camera 1000. For example, (2) in FIG. 6 illustrates that accessing protocol types of CIFS, CDMI, SD CARD and AUTO are supported by the surveillance camera 1000.

FIG. 7 illustrates an example of a configuration of commands and responses in SetStorageConfiguration. (1) in FIG. 7 illustrates details of a SetSC command to be transmitted from the client apparatus 2000 to the surveillance camera 1000. (2) in FIG. 7, on the other hand, illustrates details of a SetSC response to be returned from the surveillance camera 1000 to the client apparatus 2000.

The SetSC command as illustrated in (1) in FIG. 7 allows the client apparatus 2000 to request the surveillance camera 1000 to update details of an SC. For example, referring to (1) in FIG. 7, the client apparatus 2000 requests the surveillance camera 1000 to change the value of the type of an SC having storage1 as a value of its StorageToken to AUTO. (2) in FIG. 7 illustrates that such a request has been executed by the surveillance camera 1000.

FIG. 8 illustrates a command sequence for setting a MediaProfile for distributing a video image between the surveillance camera 1000 and the client apparatus 2000. The term "transaction" below refers to a pair of a command to be transmitted from the client apparatus 2000 to the surveillance camera 1000 and a response to be returned from the surveillance camera 1000 to the client apparatus 2000.

A transaction 6000 in FIG. 8 is executed for a network apparatus connection. The client apparatus 2000 transmits by unicast or multicast a Probe command for connecting a network apparatus to the IP network 1500. The surveillance camera 1000 connected to the IP network 1500 returns to the client apparatus 2000 a ProbeMatch response notifying that it is ready for command reception.

A Subscribe transaction 6001 allows the client apparatus 2000 to instruct an event distribution to the surveillance camera 1000.

A GetServices transaction 6002 allows the client apparatus 2000 to acquire a type of Web service supported by the surveillance camera 1000 and an address URI for using a Web service.

The client apparatus 2000 transmits a GetServices command to the surveillance camera 1000. The surveillance camera 1000 having received the command returns a response to the command. The surveillance camera 1000 is the surveillance camera which has transmitted the response to ProbeMatch to the client apparatus 2000 in the transaction 6000.

A GetProfiles transaction 6003 is executed for acquiring a MediaProfile corresponding to a distribution profile.

The client apparatus 2000 transmits a GetProfiles command to the surveillance camera 1000. The surveillance camera 1000 having received the GetProfiles command transmits a list of MediaProfiles to the client apparatus 2000.

Thus, the client apparatus 2000 acquires a list of MediaProfiles currently usable in the surveillance camera 1000 along with ProfileTokens each corresponding to a distribution profile ID for identifying a MediaProfile. The client apparatus 2000 identifies with the distribution profile ID a MediaProfile which is a distribution profile set currently present and distributable within the surveillance camera 1000 (or within an imaging device).

A transaction 6004 for GetVideoSources allows the client apparatus 2000 to acquire a list of VideoSource held in the surveillance camera 1000.

The term VideoSource refers to a set of parameters of performances of the image capturing unit 1003 included in the surveillance camera 1000. The VideoSource includes a VideoSourceToken which is an ID of the VideoSource and a Resolution describing a resolution of a captured image which may be output by the image capturing unit 1003.

The client apparatus 2000 transmits a GetVideoSources command to the surveillance camera 1000. The surveillance camera 1000 having received the GetVideoSources command returns a response to the command to the client apparatus 2000.

A GetVideoSourceConfigurations transaction 6005 is executed for acquiring a list of VideoSourceConfigurations held by the surveillance camera 1000.

The client apparatus 2000 transmits a GetVideoSourceConfigurations command to the surveillance camera 1000. The surveillance camera 1000 having received the GetVideoSourceConfigurations command returns a list including an ID of the VSC 3120 held by the surveillance camera 1000 to the client apparatus 2000.

A GetVECs transaction 6006 allows the client apparatus 2000 to acquire a list of VideoEncoderConfigurations held by the surveillance camera 1000. The list includes the VEC 3130.

The client apparatus 2000 transmits a GetVideoEncoderConfigurations command to the surveillance camera 1000. The surveillance camera 1000 having received the command returns a response to the command.

Execution of a GetConfigurations transaction 6007 allows the client apparatus 2000 to acquire set values relating to the imaging control unit 1006 in the surveillance camera 1000.

The client apparatus 2000 transmits a GetConfigurations command to the surveillance camera 1000. The surveillance camera 1000 having received command returns a response to the command to the client apparatus 2000.

A GetVECOptions transaction 6008 allows the client apparatus 2000 to acquire ranges of selections and set values for parameters acceptable by the surveillance camera 1000 with respect to a VEC designated with an ID.

The client apparatus 2000 transmits a GetVideoEncoderConfigurationOptions command to the surveillance camera 1000. The surveillance camera 1000 having received the command returns a response to the command to the client apparatus 2000.

This transaction allows the client apparatus 2000 to acquire a list including an ID of an encoding setting which is stored in the storage unit 1002 from the surveillance camera 1000. This means that the response contains PEG and H.264.

A CreateProfile transaction 6009 is executed for requesting creation of a distribution profile. The client apparatus 2000 transmits a CreateProfile command to the surveillance camera 1000. The surveillance camera 1000 having received the command returns a response to the command.

This transaction allows the client apparatus 2000 to newly create a distribution profile within the surveillance camera 1000 and acquire an ID of the created distribution profile. The surveillance camera 1000 stores the newly created distribution profile.

More specifically, the control unit 1001 newly creates a MediaProfile in accordance with the CreateProfile command received by the communication unit 1005, and a storage control process is executed for storing the created MediaProfile in the storage unit 1002.

After the command processing in the transaction, the surveillance camera 1000 transmits a MediaProfile change notification event to the client apparatus 2000 to notify the client apparatus 2000 of that some change has occurred in the MediaProfile.

An AddVideoSourceConfiguration transaction 6010 is executed for requesting to add an VSC. The client apparatus 2000 transmits an AddVideoSourceConfiguration command to the surveillance camera 1000. The surveillance camera 1000 having received the command returns a response to the command to the client apparatus 2000.

In this transaction, the client apparatus 2000 designates a distribution profile ID acquired in the transaction 6009 and the ID of the VSC acquired in the transaction 6005. Thus, the client apparatus 2000 associates a desired VSC corresponding to the ID of the designated VSC with the MediaProfile corresponding to the designated distribution profile ID.

On the other hand, the surveillance camera 1000 associates and stores the MediaProfile corresponding to the distribution profile ID designated by the client apparatus 2000 and a desired VSC corresponding to the ID of the VSC designated by the client apparatus 2000.

An AddVideoEncoderConfiguration transaction 6011 is executed for requesting to add a VEC. The client apparatus 2000 transmits an AddVideoEncoderConfiguration command to the surveillance camera 1000. The surveillance camera 1000 returns a response to the command to the client apparatus 2000.

In the transaction, the client apparatus 2000 designates a distribution profile ID acquired in the transaction 6009 and the ID of the VEC acquired in the transaction 6006. This allows the client apparatus 2000 to associate the VEC corresponding to the ID of the designated VEC with the MediaProfile corresponding to the designated distribution profile ID.

On the other hand, the surveillance camera 1000 associates and stores the MediaProfile corresponding to the distribution profile ID designated by the client apparatus 2000 and a desired VEC corresponding to the ID of the VEC designated by the client apparatus 2000.

After the transactions 6010 and 6011 are processed, the surveillance camera 1000 transmits a MediaProfile change notification event to the client apparatus 2000. This may notify the client apparatus 2000 of that some change has occurred in the MediaProfile.

A SetVideoEncoderConfiguration transaction 6012 is executed for setting parameters VEC. The client apparatus 2000 transmits a SetVideoEncoderConfiguration command to the surveillance camera 1000.

The surveillance camera 1000 having received the command returns a response to the command. In this transaction, the client apparatus 2000 defines a setting for the VEC acquired by the transaction 6006 based on the selection acquired in the transaction 6008. For example, the client apparatus 2000 changes the compression encoding method and cutout size for the surveillance camera 1000. The surveillance camera 1000 stores defined settings such as a compression encoding setting.

After the transaction is processed, the surveillance camera 1000 transmits a VEC change notification event to the client apparatus 2000 to notify that some change has occurred in the VEC to the client apparatus 2000. It should be noted that the SetVideoEncoderConfiguration command corresponds to a first encoding method setting command according to this exemplary embodiment.

Figure 9:
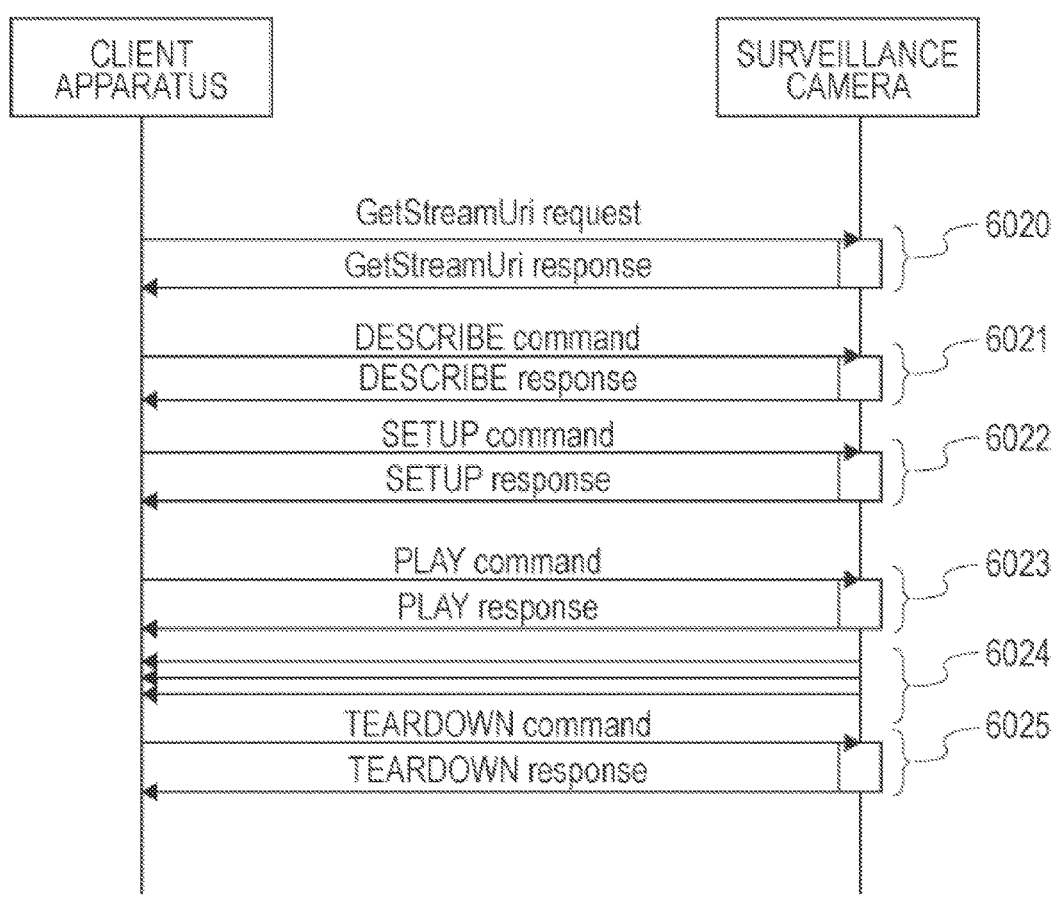
FIG. 9 illustrates a command sequence between the surveillance camera and the client apparatus according to the first exemplary embodiment of the present invention.

FIG. 9 illustrates a typical command sequence up to an image distribution between the surveillance camera 1000 and the client apparatus 2000.

A GetStreamUri transaction 6020 is executed for requesting to acquire a distribution address. In the transaction, the client apparatus 2000 designates the distribution profile ID acquired by the transaction 6009 and acquires an address (URI) for acquiring image data, for example, to be streamed based on settings for the designated distribution profile.

The surveillance camera 1000 returns to the client apparatus 2000 an address for streaming image data corresponding details of the VSC and VEC associated with the distribution profile ID designated by the client apparatus 2000.

A DESCRIBE transaction 6021 is executed for requesting to acquire distribution information. The client apparatus 2000 transmits a DESCRIBE command to the surveillance camera 1000. The surveillance camera 1000 having received the command returns a response to the command to the client apparatus 2000.

In the transaction, the client apparatus 2000 uses an URI acquired by the transaction 6020 to execute the DESCRIBE command. Thus, the client apparatus 2000 requests and acquires information on a content to be streamed by the surveillance camera 1000.

A SETUP transaction 6022 is executed to request distribution settings. The client apparatus 2000 transmits a SETUP command to the surveillance camera 1000. The surveillance camera 1000 having received the command returns a response to the command to the client apparatus 2000.

In the transaction, the client apparatus 2000 causes the surveillance camera 1000 to prepare for streaming based on detail data regarding the distribution information acquired by the transaction 6021. This command is executed to share a transmission method for a stream including a session number between the client apparatus 2000 and the surveillance camera 1000.

A PLAY transaction 6023 is executed for starting streaming. The client apparatus 2000 transmits a PLAY command to the surveillance camera 1000. The surveillance camera 1000 having received the command returns a response to the command to the client apparatus 2000.

The client apparatus 2000 uses the session number acquired by the transmission 6022 for transmitting the PLAY command to the surveillance camera 1000 so that the surveillance camera 1000 may be caused to request to start streaming.

A stream 6024 is distributed from the surveillance camera 1000 to the client apparatus 2000. The stream requested to start in the transaction 6023 is distributed by the transmission method shared by the transaction 6022.

A TEARDOWN transaction 6025 is executed for stopping the distribution. The client apparatus 2000 transmits a TEARDOWN command to the surveillance camera 1000. The surveillance camera 1000 having received the command returns a response to the command to the client apparatus 2000.

In the transaction, the client apparatus 2000 executes the TEARDOWN command by designating the session number acquired by the transaction 6022 so that the surveillance camera 1000 may be caused to request to stop the streaming.

Figure 10:
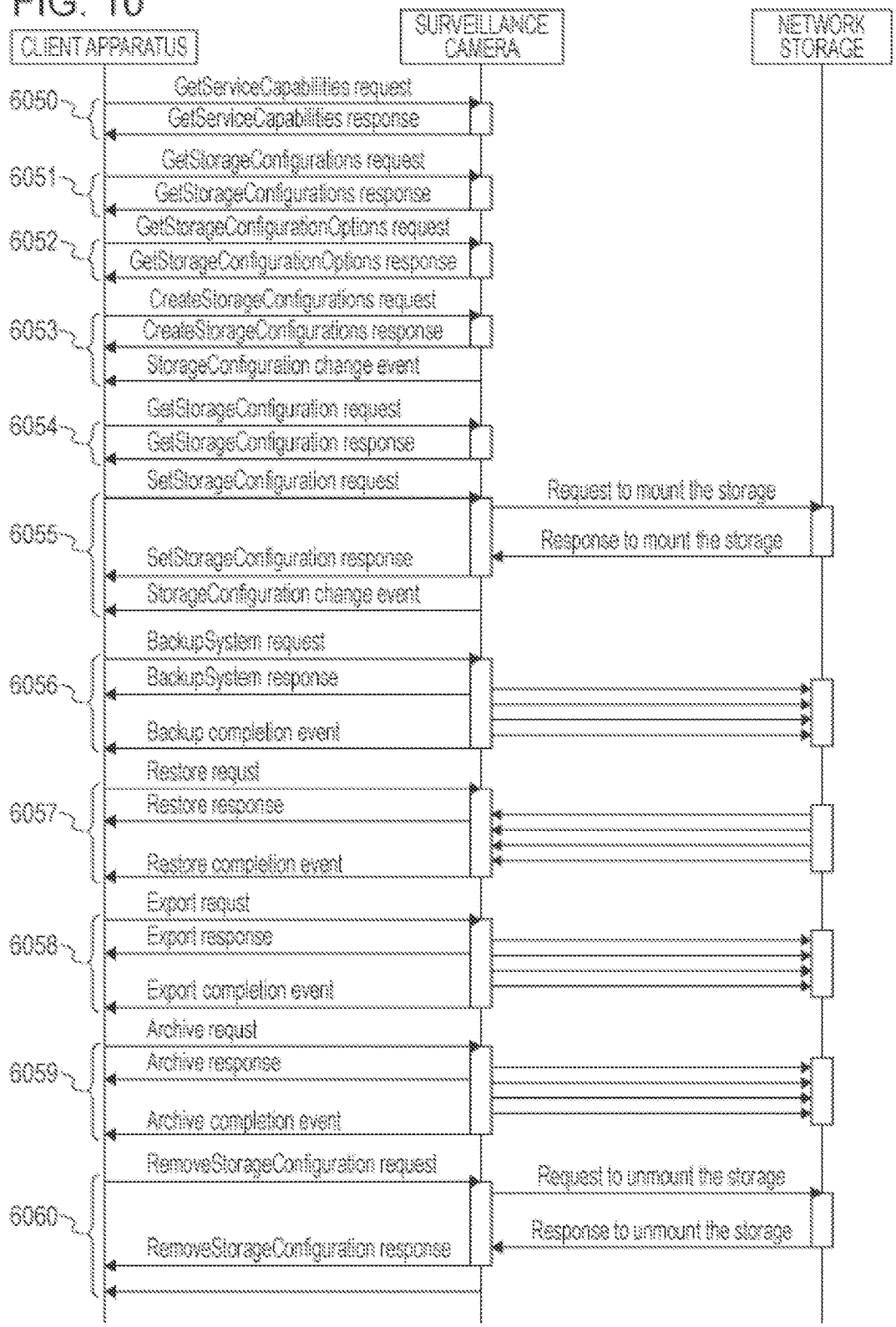
FIG. 10 illustrates a command sequence among the surveillance camera, the client apparatus and a network storage according to the first exemplary embodiment of the present invention.

FIG. 10 illustrates a typical command sequence between the surveillance camera 1000 and the client apparatus 2000 and between the surveillance camera 1000 and a storage, involving parameter setting relating to the storage and accesses to the storage.

A transaction 6050 is for a GetServiceCapabilities command. The GetServiceCapabilities command is a command for instructing to return function information describing a function supported by the surveillance camera 1000.

The function information includes information describing whether the surveillance camera 1000 supports an SC-related command or not. The function information includes information describing a maximum number of SCs held by the surveillance camera 1000.

A transaction 6051 is for the GetSCs command illustrated in FIG. 5.

A transaction 6052 is for the GetSCOptions command illustrated in FIG. 6.

A CreateSCs transaction 6053 is executed for requesting to create an SC. The client apparatus 2000 transmits the CreateSCs command to the surveillance camera 1000. The surveillance camera 1000 having received the command returns a response to the command.

This transaction allows the client apparatus 2000 to newly create an SC within the surveillance camera 1000 and acquire an ID of the created SC. The (storage unit 1002 in) the surveillance camera 1000 stores the newly created SC.

A GetStorageConfiguration transaction 6054 is executed to acquire a StorageConfiguration.

The client apparatus 2000 transmits a GetSC command to the surveillance camera 1000. Then, the surveillance camera 1000 having received the GetSC command transmits the setting details of the SC designated by the command to the client apparatus 2000.

Thus, the client apparatus 2000 acquires a StorageToken corresponding to the ID for identifying the SC and a list of StorageConfigurations currently usable by the surveillance camera 1000. The client apparatus 2000 identifies an SC present within the surveillance camera 1000 with its StorageToken.

A SetSC transaction 6055 is executed for setting parameters for the SC. The client apparatus 2000 transmits the SetSC command to the surveillance camera 1000. The surveillance camera 1000 having received the command returns a response to the command.

Through the transaction, the surveillance camera 1000 mounts a storage designated by the SetSC command transmitted from the client apparatus 2000. For example, the surveillance camera 1000 transmits a command for requesting to mount to the storage (network storage) designated by the command.

After the transaction is processed, the surveillance camera 1000 notifies the client apparatus 2000 of that some change has occurred in the SC by transmitting an SC change notification event to the client apparatus 2000. The SetSC command according to this exemplary embodiment corresponds to a mount command to cause the surveillance camera 1000 to mount a network storage.

A BackupSystem transaction 6056 is executed for requesting to back up data designated by a BackupSystem command to a storage designated by the command, for example.

The client apparatus 2000 transmits the command to the surveillance camera 1000. On the other hand, the surveillance camera 1000 having received the command returns a BackupSystem response. The response includes a BackupToken. The surveillance camera 1000 having returned the response transfers data to be backed up to a storage designated by the command.

The storage is a network storage mounted by the surveillance camera 1000 in the transaction 6055, for example. After the backup (involving the transfer) completes, the surveillance camera 1000 transmits a Backup completion event to the client apparatus 2000 in order to notify the client apparatus 2000 on the IP network 1500 of that the execution of the command has completed.

The BackupSystem command according to this exemplary embodiment corresponds to a backup command. Data to be backed up according to this exemplary embodiment may include audio data, meta data, and data (such as system setting information and operation logs) excluding image data.

A Restore transaction 6057 is executed for requesting to restore within the surveillance camera 1000 data (such as data backed up in the transaction 6056) designated by the Restore command, for example.

The client apparatus 2000 transmits the command to the surveillance camera 1000. In this case, the client apparatus 2000 designates in the command a BackupToken acquired in the transaction 6056.

On the other hand, the surveillance camera 1000 having received the command reads out from the storage unit 1002 information describing backup data associated with the BackupToken designated by the command. The surveillance camera 1000 further reads out a StorageToken associated with the BackupToken from the storage unit 1002.

The surveillance camera 1000 then determines a storage corresponding to the read StorageToken as a backup destination storage and reads out the backup data described by the read information from the backup destination storage. Next, the surveillance camera 1000 restores the read backup data into (the storage unit 1002 in) the surveillance camera 1000.

After the restore process completes, the surveillance camera 1000 transmits a Restore completion event to the client apparatus 2000 in order to notify the client apparatus 2000 on the IP network 1500 of that the execution of the command has completed.

An Export (ExportVideos transaction 6058 is executed for requesting the surveillance camera 1000 to back up image data designated as an argument of the ExportVideos command to a storage designated as an argument of the command, for example.

The client apparatus 2000 transmits the command to the surveillance camera 1000. On the other hand, the surveillance camera 1000 having received the command returns an Export Videos response to the client apparatus 2000. The surveillance camera 1000 transfers image data designated as an argument of the command to a storage designated as an argument of the command.

The storage here is a network storage mounted by the surveillance camera 1000 in the transaction 6055, for example. After the transfer completes, the surveillance camera 1000 transmits an Export completion event to the client apparatus 2000 in order to notify the client apparatus 2000 on the IP network 1500 of that the execution of the command has completed.

According to this exemplary embodiment, the BackupSytem command and ExportVideos command correspond to a record command. In particular, according to this exemplary embodiment, the ExportVideos command corresponds to an image record command. According to this exemplary embodiment, the commands in the transactions 6056, 6057, 6058, and 6059 correspond to an access command.

An Archive transaction 6059 is executed for requesting the surveillance camera 1000 to compress image data designated as an argument of the Archive command and store the compressed image data to a storage designated as an argument of the command, for example.

The client apparatus 2000 transmits the command to the surveillance camera 1000. On the other hand, the surveillance camera 1000 having received the command returns an Archive response to the client apparatus 2000. The surveillance camera 1000 compresses image data designated as an argument of the command. Next, the surveillance camera 1000 transfers the compressed image data to a storage designated as an argument of the command.

After the transfer completes, the surveillance camera 1000 transmits an Archive completion event to the client apparatus 2000 in order to notify the client apparatus 2000 on the FP network 1500 of that the execution of the command has completed.

A RemoveSC transaction 6060 is executed for requesting the surveillance camera 1000 to unmount a storage designated as an argument of the RemoveSC.

The surveillance camera 1000 executes the unmount of the storage designated by the command. More specifically, the client apparatus 2000 transmits the command to the surveillance camera 1000. On the other hand, the surveillance camera 1000 having received the command returns a response to the command to the client apparatus 2000.

The surveillance camera 1000 reads out from the storage unit 1002 information on an SC corresponding to a StorageToken designated as an argument of the command. The surveillance camera 1000 next executes an unmount process on a storage described by the information based on the read information. For example, the surveillance camera 1000 having received the command executes a similar process to that of the unmount command in a Unix (registered trademark) system.

After the transaction is processed, the surveillance camera 1000 transmits an SC change notification event to the client apparatus 2000 to notify the client apparatus 2000 of that some change has occurred in the SC.

Figure 11:
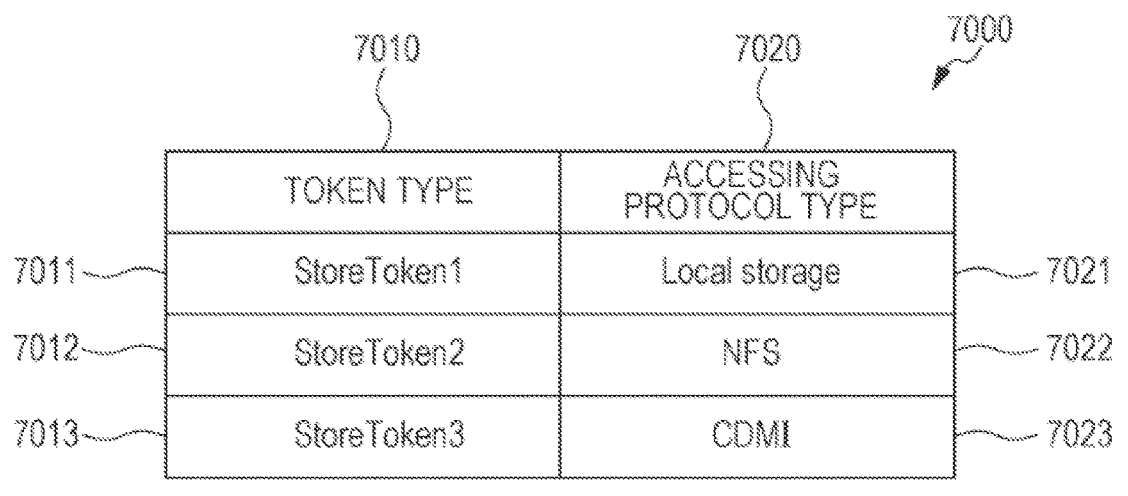

FIG. 11 illustrates a table 7000 illustrating Tokentypes 7010 of Storages and accessing protocol types 7020 in association. Here, the table 7000 is stored in the storage unit 1002. In the table 7000, StorageTokens and RecordingTokens may be stored in a column of the Tokentypes 7010. In the table 7000, information regarding units which access storages are stored in a column of the accessing protocol type 7020.

For example, in the table 7000, a Tokentype 7011 having a value of StoreToken1 and an accessing protocol type 7021 having a value of LocalStorage are associated. The StoreToken1 corresponds to a value of RecordingToken. In other words, the storage unit 1002 stores a recording file designated with StoreToken1.

In the table 7000, a Tokentype 7012 having a value of StoreToken2 and an accessing protocol type 7022 having a value of NFS are associated. The StoreToken2 corresponds to the value of StorageToken. In other words, the storage unit 1002 stores a StorageConfiguration designated with StoreToken2.

In the table 7000, a Tokentype 7013 having a value of StoreToken3 and an accessing protocol type 7023 having a value of CDMI are associated. The StoreToken3 corresponds to a value of StorageToken. In other words, the storage unit 1002 stores a StorageConfiguration designated with StoreToken3.

Figure 12:
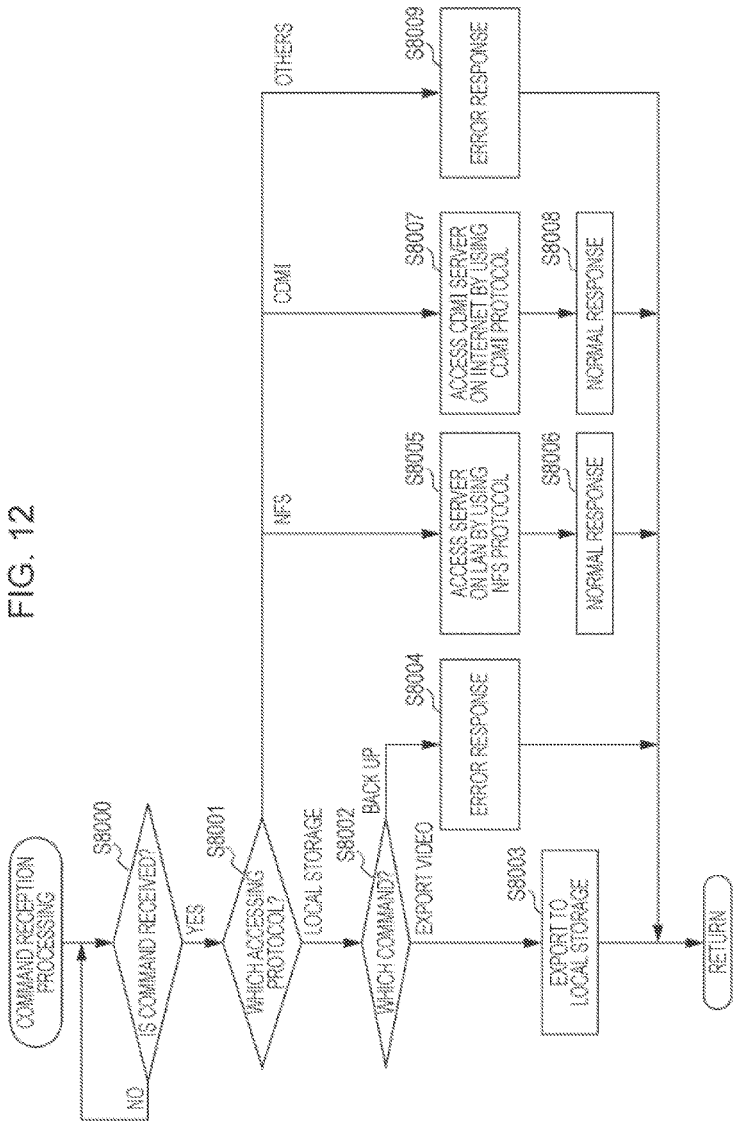
FIG. 12 is a flowchart for explaining command reception processing in the surveillance camera according to the first exemplary embodiment of the present invention.

FIG. 12 is a flowchart describing processing in the surveillance camera 1000 for receiving a command from the client apparatus 2000 according to this exemplary embodiment. This processing is executed by the control unit 1001.

In step S8000, the control unit 1001 determines whether the communication unit 1005 has received a command from the client apparatus 2000 or not. Here, a command to be received is assumed to be any one of the commands illustrated in FIG. 10.

If the control unit 1001 determines that the communication unit 1005 has received a command from the client apparatus 2000, the processing moves to step S8001. On the other hand, if the control unit 1001 determines that the communication unit 1005 has not received a command from the client apparatus 2000, the processing moves to step S8000.

In step S8001, the control unit 1001 determines an accessing protocol corresponding to the command received by the communication unit 1005. More specifically, the control unit 1001 reads out from the table 7000 an accessing protocol type associated with a Token (such as a StorageToken) designated with an argument of the command. Next, the control unit 1001 identifies the read accessing protocol type. Here, the Token includes the Token of the StorageConfiguration created by a CreateStorageConfiguration.

Then, if the read accessing protocol type is identified as LocalStorage, the control unit 1001 advances the processing to step S8002. If the read accessing protocol type is identified as NFS, the control unit 1001 advances the processing to step S8005. If the read accessing protocol type is identified as CDMI, the control unit 1001 advances the processing to step S8007.

If the control unit 1001 determines that the read accessing protocol type is others (or none of LocalStorage, NIPS, and CDMI), the processing moves to step S8009.

In step S8002, the control unit 1001 determines whether the command received by the communication unit 1005 determines whether the command is an ExportVideos command or a Backup command.

If the control unit 1001 determines whether the command received by the communication unit 1005 is an ExportVideos command, the processing moves to step S8003. On the other hand, if the control unit 1001 determines that the command received by the communication unit 1005 is a Backup command, the processing moves to step S8004.

In step S8003, the control unit 1011 transfers image data designated as an argument of the command received by the communication unit 1005 to the internal recording medium 1007. For example, the image data may be image data output from the compression encoding unit 1004.

In step S8004, the control unit 1001 instructs the communication unit 1005 to return a response indicating error to the command received by the communication unit 1005 to the client apparatus 2000. This is because data to be backed up are not limited to image data, audio data, and meta data, for example, and may not possibly stored in the internal recording medium 1007.

For example, a case may be assumed that a Token designated as an argument of the command received by the communication unit 1005 is a RecordingToken. Under this assumption, data which may store a recording file corresponding to the RecordingToken may be image data, audio data, or meta data only.

On the other hand, the data to be backed up may possibly include system setting information and operation logs, for example, of the surveillance camera 1000. Thus, a recording file corresponding to the RecordingToken may not record the data to be backed up. As a result, the surveillance camera 1000 returns a response indicating this error to the client apparatus 2000.

In step S8005, the control unit 1001 uses an NFS protocol to access the NAS 1100 on the IP network 1500. For example, the control unit 1001 uses the NFS protocol to execute processing corresponding to the transactions 6056, 6057, and 6058.

In step S8006, the control unit 1001 instructs the communication unit 1005 to return a response indicating normal to the command received by the communication unit 1005 to the client apparatus 2000.

In step S8007, the control unit 1001 uses a CDMI protocol to access the cloud storage 1200 on the Internet 1600. For example, the control unit 1001 uses the CDMI protocol to execute processing corresponding to transactions 6056, 6057, and 6058.

In step S8008, the control unit 1001 instructs the communication unit 1005 to return a response indicating normal to the command received by the communication unit 1005 to the client apparatus 2000.

In step S8009, the control unit 1001 instructs the communication unit 1005 to return a response indicating error to the command received by the communication unit 1005 to the client apparatus 2000. Though the control unit 1001 identifies the command received by the communication unit 1005 in step S8002, the processing may be moved to step S8003 also if the command is Archive.

Figure 13:
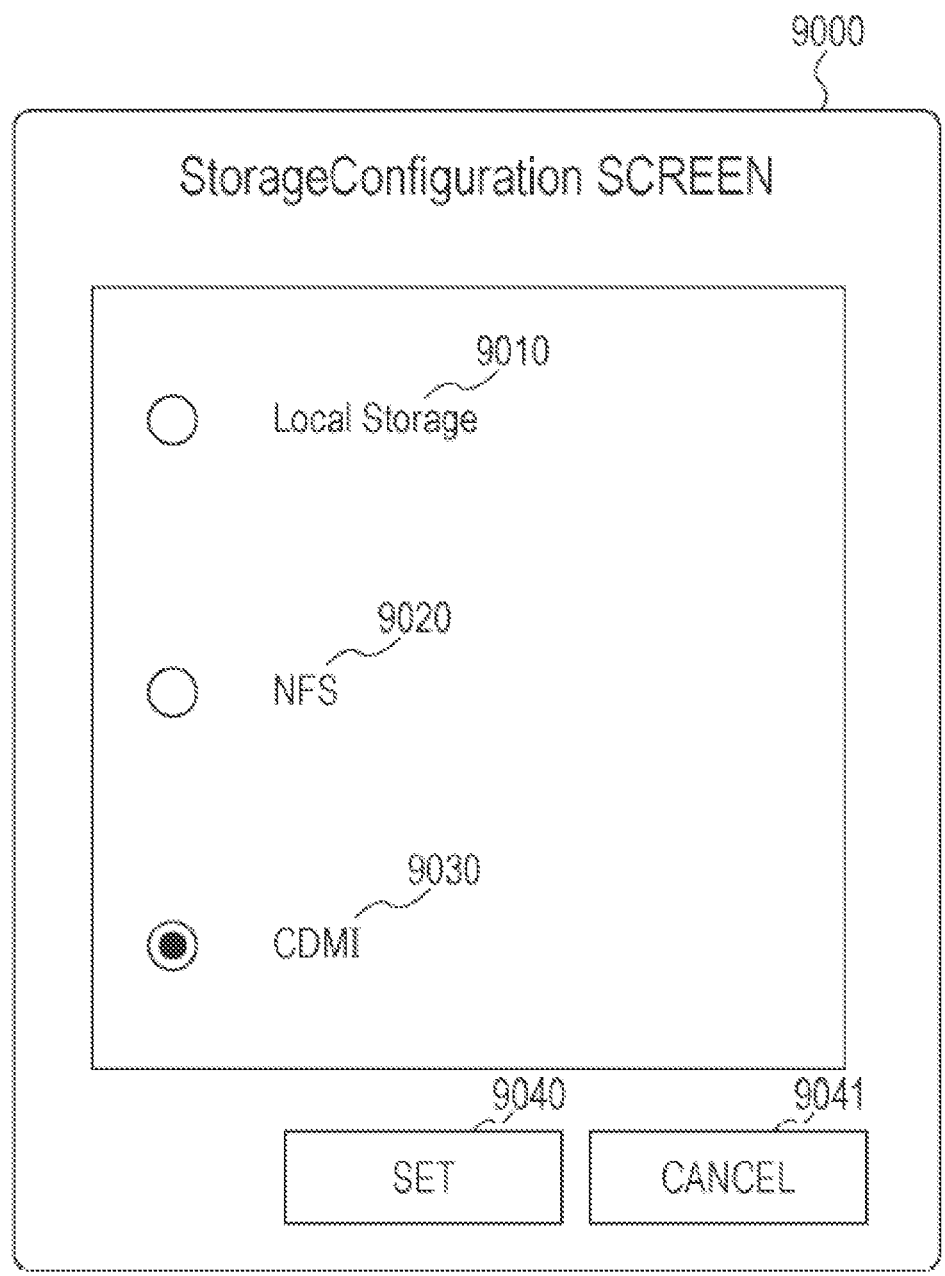
FIG. 13 illustrates an example of a StorageConfiguration screen according to the first exemplary embodiment of the present invention.

FIG. 13 illustrates a StorageConfiguration screen 9000 which is a user interface prompting a user of the client apparatus 2000 to access a storage of the surveillance camera 1000 according to this exemplary embodiment. The screen is to be displayed on the display unit 2003.

Referring to FIG. 13, a radio button corresponding to a LocalStorage 9010 corresponds to the accessing protocol type 7021 having a value of LocalStorage in the table 7000 in FIG. 11. This radio button may be pressed to instruct the surveillance camera 1000 to store image data, for example, to a LocalStorage (such as the internal recording medium 1007).

A radio button corresponding to an NES 9020 corresponds to the accessing protocol type 7022 having a value of NFS in the table 7000. This radio button may be pressed to instruct the surveillance camera 1000 to store image data, for example, to the NAS 1100 by using the NES protocol.

A radio button corresponding to a CDMI 9030 corresponds to the accessing protocol type 7023 having a value of CDMI in the table 7000. This radio button may be pressed to instruct the surveillance camera 1000 to store image data, for example, to the cloud storage 1200 by using a CDMI protocol.

The radio button corresponding to the LocalStorage 9010, the radio button corresponding to the NFS 9020, and the radio button corresponding to the CDMI 9030 are pressed alternatively by a user.

A SET button 9040 may be pressed to execute the transactions 6056, 6057, and 6058 by using, as an argument, information describing an accessing protocol type corresponding to one radio button selected by a user, for example, among those radio buttons.

A CANCEL button 9041 may be pressed to close the StorageConfiguration screen 9000 (exit). Here, designation of a Token is not necessary if a StorageConfiguration is created by the CreateStorageConfiguration command. A StorageType and a Storage path (address) are designated to execute the CreateStorageConfiguration command. Then, the surveillance camera 1000 assigns a Token and returns it to the client apparatus 2000 in response to the command.

As described above, the surveillance camera 1000 of this exemplary embodiment may store image data, for example, to an appropriate storage in accordance with a Token, which is designated by the client apparatus 2000, in a storage. As a result, the client apparatus 2000 may only be required to grasp a Token in a storage to cause the surveillance camera 1000 to store image data, for example, to the corresponding storage.

According to this exemplary embodiment, the client apparatus 2000 may only be required to designate Tokens corresponding to the internal recording medium 1007, NAS 1100, and cloud storage 1200 to cause the surveillance camera 1000 to record image data, for example, to these storages. As a result, a user who operates the client apparatus 2000 is allowed to more easily instruct the surveillance camera 1000 to store image data, for example, to the storages.

The flowchart in FIG. 12 according to this exemplary embodiment assumes a case where a StorageToken and a RecordingToken are designated as arguments of commands received by the communication unit 1005. For example, a case may be assumed where an accessing protocol type as illustrated in FIG. 4D is designated as an argument of a command.

Processing for receiving a command from the client apparatus 2000 to be performed in the surveillance camera 1000 under the assumption will be described below with reference to a flowchart in FIG. 12. Like numbers refer to like parts to those described above, and the description will sometimes be omitted.

In step S8001, the control unit 1001 determines an accessing protocol corresponding to a command received by the communication unit 1005. More specifically, the control unit 1001 determines an accessing protocol type designated as an argument of the command.

If the control unit 1001 determines that the designated accessing protocol type is LocalStorage, the processing moves to step S8002. If the control unit 1001 determines that the designated accessing protocol type is NFS, the processing moves to step S8005. If the control unit 1001 determines that the designated accessing protocol type is CDMI, the processing moves to step S8007.

If the control unit 1001 determines that the designated accessing protocol type is others (or none of LocalStorage, NFS, and CDMI), the processing moves to step S8009.

According to this exemplary embodiment, as illustrated in FIG. 12, a StorageConfiguration screen which is a user interface for allowing a user to set an accessing protocol type is displayed. However, an embodiment of the present invention is not limited thereto.

For example, as the StorageConfiguration screen, a screen may be used instead which is a user interface allowing a user to set a Token of a Storage (StorageToken, and RecordingToken).

According to this exemplary embodiment, six representative StorageTypes including SMB, CIFS, CDMI, SD CARD, and AUTO are used as illustrated in FIG. 4D. However, an embodiment of the present invention is not limited thereto.

For example, an FTP (FileTransfer Protocol) may be used as the StorageType instead of the six types. For example, as the StorageTypes, various storages may be used which may be mounted in the surveillance camera 1000 such as an USB drive and a BD-R drive which are internal recording media.

For the ExportVideos transaction 6058 according to this exemplary embodiment, the client apparatus 2000 may apply various methods for designating image data subject to Export with the ExportVideos command.

For example, a ProfileToken identifying the MP 3100 held in the surveillance camera 1000 may be designated as an argument of the command. Thus, image data to be streamed in accordance with settings for the MP 3100 is subject to Export (to be backed up to a storage).

Alternatively, for example, a RecordingToken identifying the RecordingConfiguration 3150 held in the surveillance camera 1000 may be designated as an argument of the command. Thus, a recording file corresponding to the RecordingToken is subject to Export (to be backed up in a storage).

According to this exemplary embodiment, the surveillance camera 1000 compresses image data designated with an argument of the Archive command in the Archive transaction 6059. An embodiment of the present invention is not limited thereto. For example, in the transaction, the image data may be compressed by a storage (such as a network storage in FIG. 10).

This exemplary embodiment assumes LocalStorage, NES, and CDMI as accessing protocol types to be used by the surveillance camera 1000 to access a storage. However, an embodiment of the present invention is not limited thereto. For example, as such an accessing protocol type, a unique protocol provided by a manufacturer of the surveillance camera 1000 or a manufacturer of a storage may be used.

Other Exemplary Embodiments

The present invention may be implemented by processing including supplying a program which implement one or more functions of the aforementioned exemplary embodiment to a system or an apparatus over a network or through a storage medium and reading and executing the program by one or more processors in a computer in the system or apparatus. The present invention may be implemented by a circuit (such as an ASIC) which may implement one or more functions.

Having described the exemplary embodiment of the present invention in detail, the present invention is not limited to specific exemplary embodiments. Various embodiments are included in the present invention without departing from the scope and spirit of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-039030, filed Feb. 28, 2014, which is hereby incorporated by reference herein in its entirety.

The invention claimed is:

1. An imaging apparatus to communicate with an external apparatus over a network and mount a first storage and/or a second storage, the imaging apparatus comprising:
    a receiver capable of receiving, from the external apparatus over the network, a first mount command to allow the imaging apparatus to mount the first storage and a second mount command to allow the imaging apparatus to mount the second storage;
    a mounting unit implemented by a processor and configured to mount the first storage and/or the second storage;
    a transmitter configured to transmit a response to the external apparatus over the network when the receiver receives a command; and
    a controller configured to instruct the mounting unit,
    wherein, if a mount command received by the receiver is a first mount command, the controller instructs the mounting unit to mount and access the first storage by a first access protocol for accessing the first storage,
    wherein, if the mount command received by the receiver is a second mount command, the controller instructs the mounting unit to mount and access the second storage by a second access protocol which is an access protocol for accessing the second storage and is different from the first access protocol,
    wherein the receiver receives, over the network, a first record command to record data of the imaging apparatus in the first storage and a second record command to record data of the imaging apparatus in the second storage from the external apparatus, and
    wherein the controller instructs the transmitter to transmit a response indicating error to the external apparatus over the network if the first record command is received when the mounting unit does not mount the first storage, and instructs the transmitter to transmit a response indicating error to the external apparatus over the network if the second record command is received when the mounting unit does not mount the second storage.

2. The imaging apparatus according to claim 1, wherein, if the first mount command or the second mount command is received, a response including information describing an identification (ID) of a storage mounted by the mounting unit is transmitted to the external apparatus over the network.

3. The imaging apparatus according to claim 1,
    wherein the first storage is a storage medium to be removably inserted to the imaging apparatus,
    wherein the first record command includes a first image record command to record image data within the imaging apparatus to the first storage or a first backup command to record data excluding the image data within the imaging apparatus to the first storage, and wherein the controller instructs the transmitter to transmit a response indicating normal to the external apparatus over the network if a first image record command is received by the receiver, and instructs the transmitter to transmit a response indicating error to the external apparatus over the network if a first backup command is received by the receiver.

4. The imaging apparatus according to claim 1, wherein the second storage is an external storage which communicates with the imaging apparatus over the network, wherein the second record command includes a second image record command to record image data within the imaging apparatus to the second storage or a second backup command to record data excluding the image data within the imaging apparatus to the second storage, and wherein the controller instructs the transmitter to transmit a response indicating normal to the external apparatus over the network if a second image record command is received by the receiver, and instructs the transmitter to transmit a response indicating normal to the external apparatus over the network if a second backup command is received by the receiver.

5. The imaging apparatus according to claim 1, further comprising an associate storage configured to associate and store information describing an identification (ID) of a storage mounted by the mounting unit and an access protocol for accessing a storage included in the mount command, wherein the mount command contains information regarding an access protocol for accessing a storage to be mounted, and wherein the controller performs mount control by using an access protocol associated with information describing an ID of a storage in the associate storage.

6. An external apparatus to communicate over a network with an imaging apparatus configured to mount a first storage and access by a first access protocol for accessing a first storage and mount a second storage and access by an access protocol for accessing a second storage which is different from the first storage, the external apparatus comprising:

a transmitter capable of transmitting, to the imaging apparatus over the network, a first mount command which is a command corresponding to a first protocol to allow the imaging apparatus to access the first storage and a second mount command to allow the imaging apparatus to access the second storage; and a receiver configured to receive a response to a command transmitted by the transmitter from the external apparatus over the network, and wherein the transmitter transmits, over the network, a first record command to record data of the imaging apparatus in the first storage and a second record command to record data of the imaging apparatus in the second storage from the external apparatus, and wherein the receiver receives a response indicating error from the imaging apparatus over the network if the first record command is received by the imaging apparatus when a mounting unit implemented by a processor and of the imaging apparatus does not mount the first storage, and the receiver receives a response indicating error from the imaging apparatus over the network if the second record command is received by the imaging apparatus when the mounting unit of the imaging apparatus does not mount the second storage.

7. A control method for an imaging apparatus to communicate with an external apparatus over a network and mount a first storage and/or a second storage, the control method comprising:

receiving, from the external apparatus over the network, a first mount command to allow the imaging apparatus to mount the first storage and a second mount command to allow the imaging apparatus to mount the second storage;

mounting the first storage and/or the second storage;

transmitting a response to the external apparatus over the network when a command is received; and instructing, wherein, if a received mount command is a first mount command, instructing includes instructing mount and accessing the first storage by a first access protocol for accessing the first storage, wherein, if the received mount command is a second mount command, instructing includes instructing mounting and accessing the second storage by a second access protocol which is an access protocol different from the first access protocol, wherein receiving includes receiving, over the network, a first record command to record data of the imaging apparatus in the first storage and a second record command to record data of the imaging apparatus in the second storage from the external apparatus, and wherein instructing includes instructing to transmit a response indicating error to the external apparatus over the network if the first record command is received when mounting does not mount the first storage, and instructing includes instructing to transmit a response indicating error to the external apparatus over the network if the second record command is received when mounting does not mount the second storage.

* * * * *